UNITED STATES PATENT OFFICE.

CHARLES ADAMS, OF PITTSBURG, PENNSYLVANIA.

IMPROVEMENT IN ALLOYS OR METALLIC COMPOUNDS FOR BEARINGS, &c.

Specification forming part of Letters Patent No. 132,744, dated November 5, 1872.

*To all whom it may concern:*

Be it known that I, CHARLES ADAMS, of Pittsburg, in the county of Allegheny and State of Pennsylvania, have invented a new Metallic Compound which I denominate the Excelsior Alloy; and I do hereby declare that the following is a full, clear, and exact description thereof.

My improved alloy is designed for journal-bearings and other purposes, and is composed of zinc, iron, copper, and phosphorus.

The substance which is found as a residuum of galvanizing works, and known as "dross," is composed of zinc and iron in about the proportions of ninety-six per centum of the former and four per centum of the latter. These are just about the proportions of the two metals, which, when melted together with copper, will afford the best results. I therefore take—say, two parts of the dross referred to, and two parts of copper and melt them together in a crucible. These proportions will afford a good metal for journal-bearings. For small and strong castings I prefer to use about one and three-quarter parts of the dross and two parts of copper. For sheets I use two parts of copper and one and a half parts of the dross. The dross is prepared for use by simply melting it and running it into pigs. It may then be melted with copper in various proportions, and, if desirable, a small quantity of phosphorus—say about one ounce to one hundred pounds of the alloy—may be added while the alloy is in the crucible in a melted state.

By my invention I obtain a metal resembling brass, but which is much cheaper, on account of the substitution and utilization of the dross or refuse of galvanizing works, for the expensive metal, tin. I also obtain a metal which will not "cut" when used for journal-boxes, a property which has not hitherto been found in any of the copper alloys.

Having described my invention, I claim—

An alloy composed of the refuse of galvanizing works, denominated dross, in combination with copper, and with or without the addition of phosphorus, melted together in about the proportions specified.

CHARLES ADAMS.

Witnesses:
B. H. LAND,
DAVID ADAMS.